(12) United States Patent
Lin et al.

(10) Patent No.: US 9,940,100 B2
(45) Date of Patent: Apr. 10, 2018

(54) SHORTLIST COMPUTATION FOR SEARCHING HIGH-DIMENSIONAL SPACES

(71) Applicant: Adobe Systems Incorporated, San Jose, CA (US)

(72) Inventors: Zhe Lin, Fremont, CA (US); Jonathan Brandt, Santa Cruz, CA (US); Xiaohui Shen, San Jose, CA (US); Jae-Pil Heo, San Jose, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 566 days.

(21) Appl. No.: 14/473,104

(22) Filed: Aug. 29, 2014

(65) Prior Publication Data
US 2016/0062731 A1    Mar. 3, 2016

(51) Int. Cl.
*G06F 17/30* (2006.01)
*G06F 7/24* (2006.01)

(52) U.S. Cl.
CPC .......... *G06F 7/24* (2013.01); *G06F 17/30268* (2013.01); *G06F 17/30271* (2013.01); *G06F 17/30622* (2013.01)

(58) Field of Classification Search
CPC ......... G06F 17/30448; G06F 17/30707; G06F 17/3069; G06F 17/30799
See application file for complete search history.

(56) References Cited

U.S. PATENT DOCUMENTS

| | | | | |
|---|---|---|---|---|
| 9,037,600 | B1* | 5/2015 | Garrigues | G06F 17/30265 707/769 |
| 2008/0212899 | A1* | 9/2008 | Gokturk | G06F 17/30259 382/305 |
| 2011/0249899 | A1* | 10/2011 | Wu | G06K 9/6211 382/190 |
| 2011/0313999 | A1* | 12/2011 | Bruno | G06F 17/30463 707/718 |

(Continued)

OTHER PUBLICATIONS

H. J'egou, M. Douze, and C. Schmid, "Product Quantization for Nearest Neighbor Search," IEEE Transactions on Pattern Analysis and Machine Intelligence, vol. 33, No. 1, Jan. 2011, 12 pages.

(Continued)

*Primary Examiner* — Mariela Reyes
*Assistant Examiner* — Courtney Harmon
(74) *Attorney, Agent, or Firm* — Finch & Maloney PLLC (57) ABSTRACT

Techniques are disclosed for indexing and searching high-dimensional data using inverted file structures and product quantization encoding. An image descriptor is quantized using a form of product quantization to determine which of several inverted lists the image descriptor is to be stored. The image descriptor is appended to the corresponding inverted list with a compact coding using a product quantization encoding scheme. When processing a query, a shortlist is computed that includes a set of candidate search results. The shortlist is based on the orthogonality between two random vectors in high-dimensional spaces. The inverted lists are traversed in the order of the distance between the query and (Continued)

the centroid of a coarse quantizer corresponding to each inverted list. The shortlist is ranked according to the distance estimated by a form of product quantization, and the top images referred to by the ranked shortlist are reported as the search results.

20 Claims, 9 Drawing Sheets

(56) References Cited

U.S. PATENT DOCUMENTS

2012/0054177 A1* 3/2012 Wang ............... G06F 17/30277
707/723

OTHER PUBLICATIONS

T. Cai, J. Fan, and T. Jiang, "Distributions of Angles in Random packing on Spheres," Journal of Machine Learning Research vol. 14, 2013, pp. 1837-1864.

M. Norouzi and D. J. Fleet, "Cartesian k-means," CVPR, 2013, 8 pages.

T. Ge, K. He, Q. Ke and J. Sun, "Optimized Product Quantization for Approximate Nearest Neighbor Search," CVPR, 2013, 8 pages.

J.-P. Heo, Z. Lin, and S.-E. Yoon, "Distance Encoded Product Quantization," CVPR, 2014, 8 pages.

* cited by examiner

SHORTLIST COMPUTATION FOR SEARCHING HIGH-DIMENSIONAL SPACES

FIELD OF THE DISCLOSURE

This disclosure relates to the field of data processing, and more particularly, to techniques for indexing and searching high-dimensional data spaces.

BACKGROUND

An information retrieval process begins when a user provides a query against which objects of information in a database are matched using a search algorithm. To increase the processing speed of the search algorithm, the algorithm can operate on a pre-computed index of the information rather than on the information itself. The search algorithm may return one or more objects matching the query, possibly having varying degrees of relevancy. With respect to highly dimensional data, such as image data, traditional data structures and search mechanisms do not provide sufficient scalability in terms of both the size and dimensionality of this data. Thus, there is a need for scalable indexing and search methods for fast and effective retrieval of highly dimensional data.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

An object is an entity that is represented by information in a database. Depending on the application, the data objects may be, for example, text documents, images, audio, or videos. User queries are matched against the database information or an index of the database. This matching process becomes increasingly complex as the size of the database and the dimensionality of the data increases. Such high-dimensional data spaces are often encountered in areas such as imaging, where the number of dimensions is at least the number of quantifiable features of the images (e.g., content, colors, textures, patterns, etc.). Vector quantization is a technique for encoding high-dimensional data into compact codes while preserving distance information. These compact codes form a much smaller data set upon which perform an approximate nearest neighbor search can be performed, reducing memory and processing resources significantly. One form of vector quantization is product quantization, in which the high-dimensional space is decomposed into the Cartesian product of a finite number of low-dimensional, separately quantized subspaces using k-means clustering techniques. However, as information is retrieved from ever larger databases of items (e.g., web-scale retrieval), the need for fast, efficient and good quality information retrieval systems grows. Prior approaches use very large indexes which generalize poorly for measuring similarity of general object classes as opposed to specific object instances. For example, in an existing approach, a shortlist of potential search result candidates is generated by retrieving all data points within the three or four clusters having centroids closest to the query data point. A disadvantage of this technique is that the approximation is limited to the data indexed by the selected clusters, and as such the resulting shortlist may refer to some data points that are further in distance from the query data point than others that are not included due to the distance of their respective cluster centroids. Likewise, some other data points that are closer in distance from the query data point than others may be excluded due to their locations in clusters with more distant centroids. Furthermore, the results are often unsuitable for many types of ranking functions when large indexes are used.

To this end, and in accordance with an embodiment of the present invention, techniques are provided for indexing and searching high-dimensional data using inverted file structures and product quantization encoding. When initially storing an image to a database, a corresponding image descriptor x is quantized using a form of product quantization to determine which of several inverted lists the image descriptor is to be stored. The image descriptor x is then appended to the corresponding inverted list with a compact coding of x using a product quantization encoding scheme. A shortlist can be pre-computed that includes a set of candidate search results having a size T. Both search accuracy and search time depend on the quality of the shortlist. Thus, for a fixed size T, the search accuracy is higher if the quality of the shortlist is high. To accomplish this, the shortlist is based on the orthogonality between two random vectors in high-dimensional spaces. When processing a query having an image descriptor y, the inverted lists are traversed in the order of the distance between the query y and the centroid of a coarse quantizer corresponding to each inverted list to collect T candidates. The shortlist is then ranked according to the distance estimated by a form of product quantization, and the top R images referred to by the ranked shortlist are reported as the search results. Numerous configurations and variations will be apparent in light of this disclosure.

As used in this disclosure, the terms "inverted list," "inverted file" and "inverted index" refer to a data structure for storing a mapping between content (e.g., text, images, etc.) stored in a database file or other form of data storage and the location of the content in the database or storage.

Example System

Figure 1:
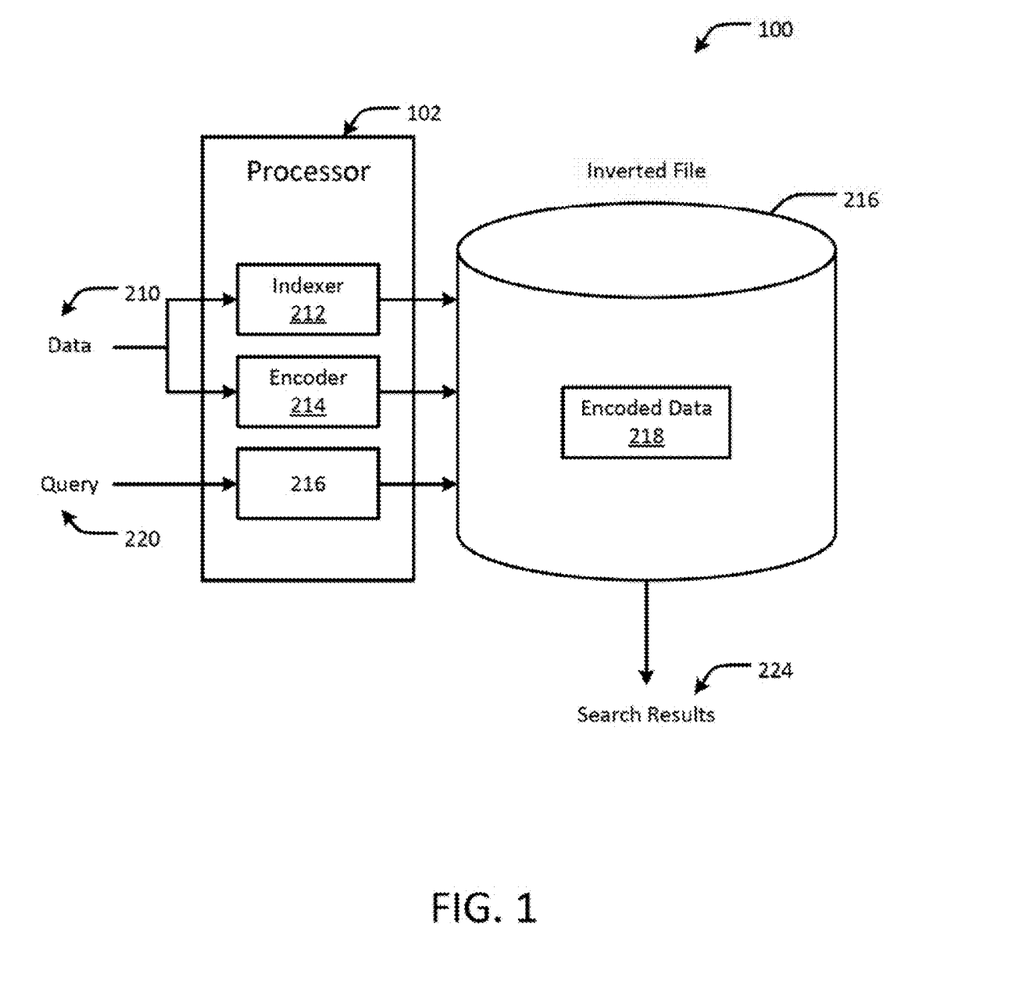
FIG. 1 illustrates an example system for indexing and searching for data, in accordance with an embodiment of the present invention.

FIG. 1 illustrates an example system 100 for indexing, encoding and searching for data, such as image data, in accordance with an embodiment. The system 100 includes one or more processors 102. Generally, the computer 102 can be included in any type of device, such as a personal computer (PC), tablet, or smart phone, configured to receive data 210. The processor 102 includes an indexer 212, an encoder 214, and a searcher 222. An inverted file 216 can be a data structure stored in a storage, such as a database. Data 210 can be input into the system 100 via an indexer 212 and encoder 214. The data may represent any type of information, such as text, documents, images, videos, audio recordings, etc. The indexer 212 is configured to generate or modify the inverted file 216 having a plurality of lists based on the data 210. The encoder 214 is configured to generate encoded data 218 based on the data 210. The encoded data 218 is stored within the inverted file 216. A query 220 can be input into the system 200, which in turn generates search results 224.

Figure 2:
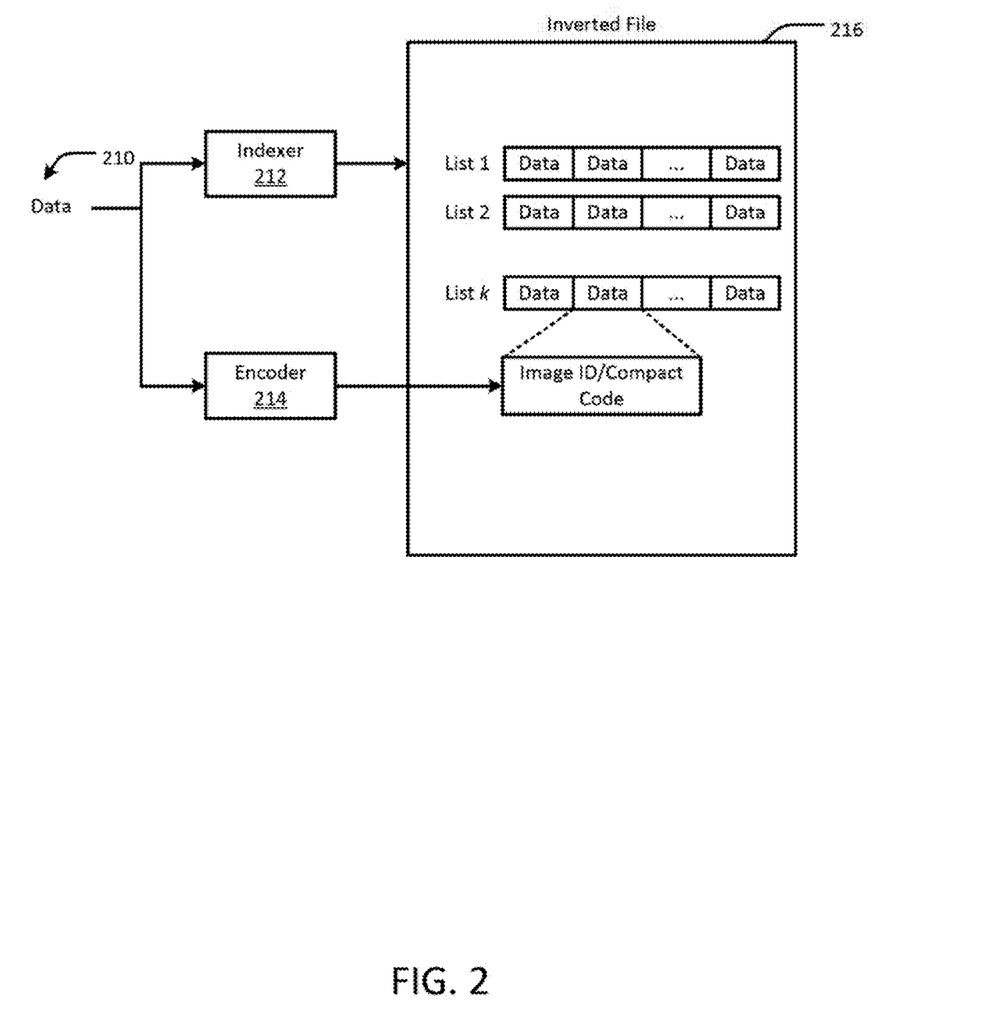
FIG. 2 illustrates a portion of the example system of FIG. 1 in further detail, in accordance with an embodiment of the present invention.

FIG. 2 illustrates a portion of the example system 100 of FIG. 1 in further detail, in accordance with an embodiment. As described above, the indexer 212 is configured to generate or modify the inverted file 216, which includes a plurality of inverted lists 1 . . . k. Each inverted list is an index to the data points associated with one of k groups of data points (e.g., clusters generated by k-means clustering or another clustering algorithm). Each data point in a group is referenced in the corresponding list using an encoded data block, which forms a portion of the encoded data 218. For example, the encoded data block may contain a unique image identifier (for image data) or other compact code generated by the encoder 214. The information in the encoded data block can be used to identify, locate and retrieve the original data 210 from storage. The encoded data 218 enables fast searches of the data in storage by the searcher 222 based on the query 220.

Figure 3A:
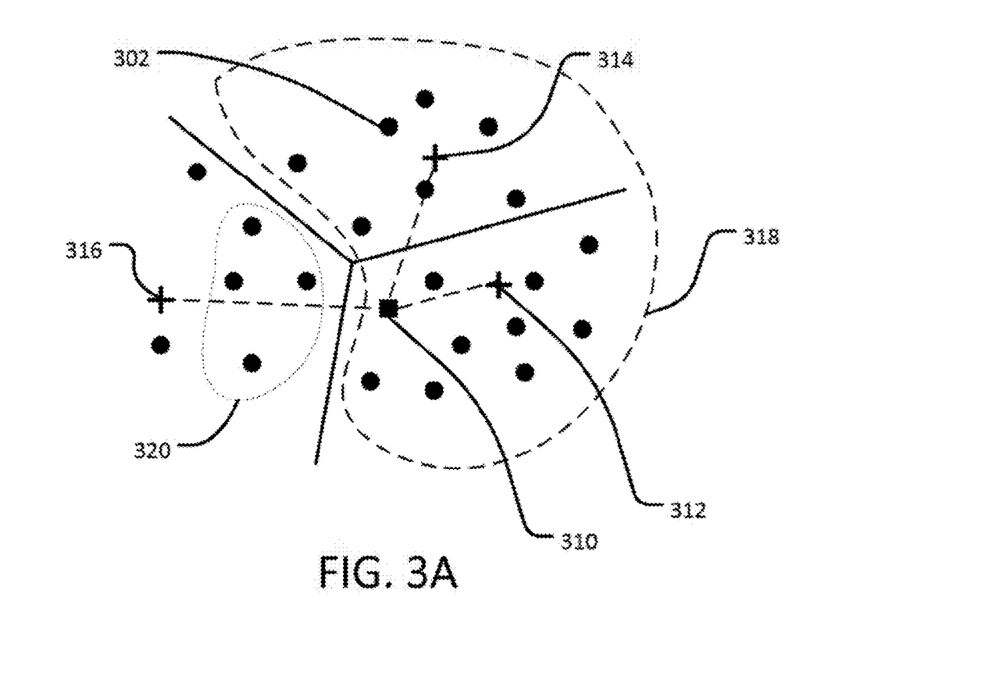
FIGS. 3A and 3B depict a set of example data points, in accordance with several embodiments of the present invention.
Figure 3B:
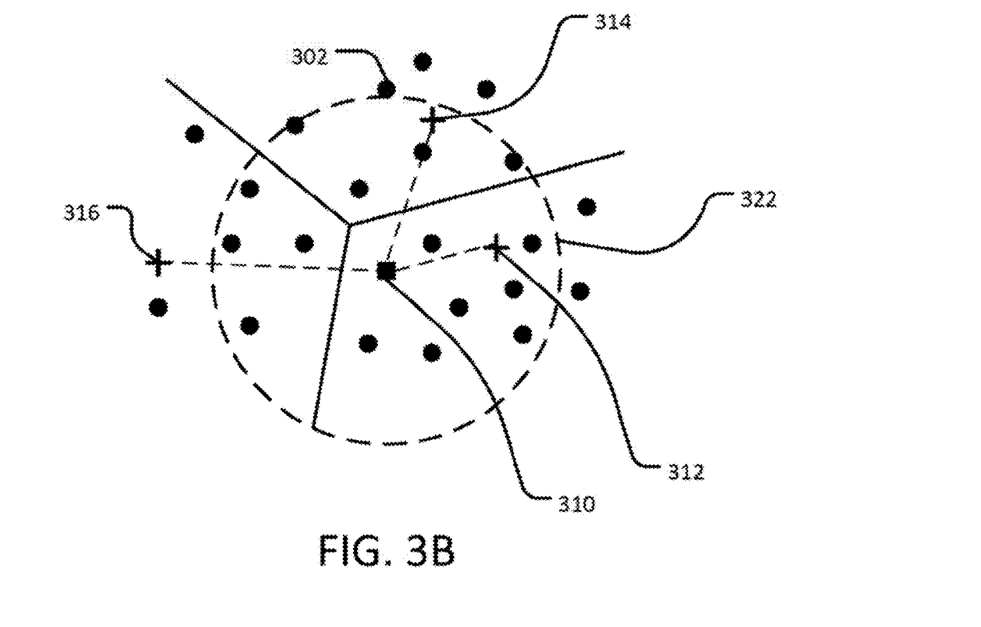

FIGS. 3A and 3B depict a set of example data points (one of which is indicated at 302) generally represented by dots, in accordance with several embodiments. These data point refer to discrete objects, such as text, documents, images, or other data objects of a database quantized in Cartesian space. The objects are separated into three clusters, where the average of all data points in each cluster is the centroid, generally represented by plus signs. The centroid of Cluster 1 is indicated at 312, the centroid of Cluster 2 is indicated at 314, and the centroid of Cluster 3 is indicated at 316. A query y is indicated at 310. The query 310 represents a user input, for example, a search query term, which may be text or an image for which one or more matching objects 302 are to be located.

An example shortlist for the given query 310 generated using an existing technique includes all of the data points within the dashed line 318, as depicted in FIG. 3A. The shortlist 318 represents the data referenced by at least a portion of the inverted lists in the inverted file. 318 is based on a distance estimator between the query y 312 and the centroid of the cluster containing a given data point x 302 as follows:

$$\tilde{d}(y,x) = d(y,c(x))$$

Using this distance estimator, data points contained in clusters having centroids that are relatively close to the query 312 are selected for inclusion in the shortlist, while data points contained in clusters having more distant centroids are not included in the shortlist. However, this distance estimator can be inaccurate and can cause high quantization error. Therefore, this shortlist construction scheme has a limitation that some close points to the query can be missed in the shortlist. For example, the data points in the shortlist 318 correspond to all of the data points in Cluster 1 and Cluster 2, but none of the data points in Cluster 3. In this example, Clusters 1 and 2 are chosen for inclusion in the shortlist 318, and all of the data points in Cluster 3 are chosen for exclusion, because the query 310 is closer to centroids 312 and 314 than to centroid 316 according to the distance estimator. In other words, because centroid 316 (Cluster 3) is farther from the query 310 than centroid 312 (Cluster 1) and centroid 314 (Cluster 2), the data points within the dashed line 320 are not selected even though they are closer to the query 310 than some of the data points in the shortlist 318. As such, the shortlist 318 has the disadvantage of not including some potentially relevant data points, such as those indicated at 320.

By contrast, and in accordance with an embodiment of the present invention, another example shortlist for the same query 310 can include at least T data points within the dashed line 322, as depicted in FIG. 3B. As the dimensionality of the data space increases, the likelihood that two random vectors are orthogonal increases. Thus, in an embodiment, the shortlist 322 is based on the estimated distance between two random, orthogonal vectors as the square of the sum of squared distances between each of two data points and a cluster center. Specifically, the shortlist 322 is generated based on the estimated distance between the query y 312 and the centroid of the cluster containing a given data point x 302, where a vector from the centroid to the query y 312 is orthogonal to a vector from the centroid to the data point x 302 as follows:

$$\tilde{d}(y,x)^2 = d(y,c(x))^2 + d(x,c(x))^2 = h^2 + r^2$$

Using this distance estimator, the data points in the shortlist 322 correspond to some, but not necessarily all, data points in Clusters 1, 2 and 3 that are within a given distance of the query 310, in contrast to the shortlist 318 of FIG. 3A. As such, some data points in Cluster 3 (e.g., those included in the region 320 of FIG. 3A) which were not included in the shortlist 318 are included in the shortlist 322, which as a result is more accurately constructed than the shortlist 318.

Figure 4A:
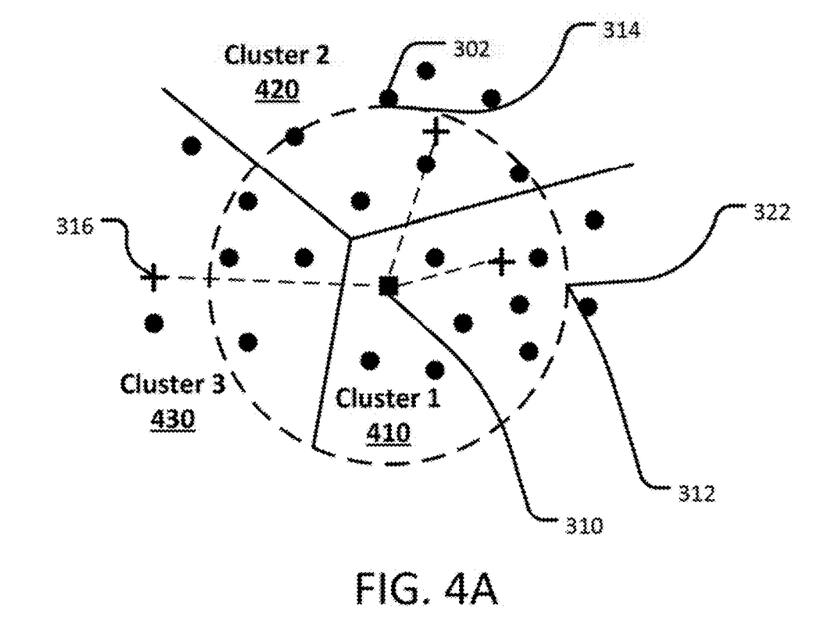
FIG. 4A depicts the set of example data points of FIGS. 3A and 3B, further showing an example shortlist in accordance with an embodiment of the present invention.
Figure 4B:
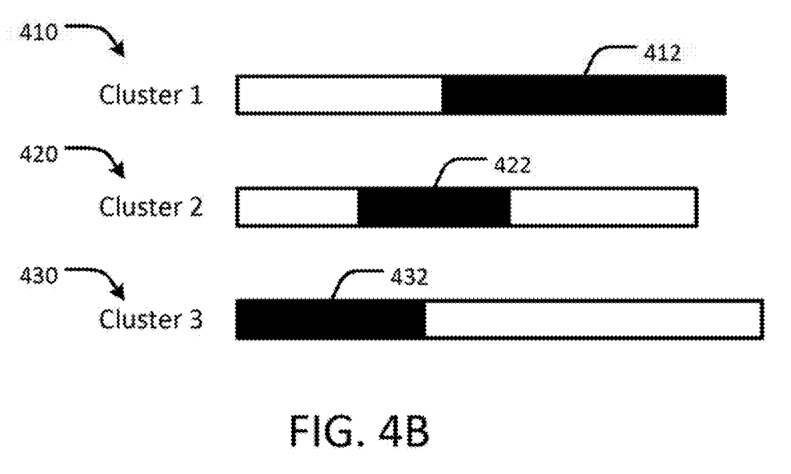
FIG. 4B illustrates an alternate representation of the example shortlist of FIG. 4A, in accordance with an embodiment of the present invention.

FIG. 4A depict the set of example data points of FIGS. 3A and 3B, further showing the shortlist 322 encompassing portions of Cluster 1 (410), Cluster 2 (420) and Cluster 3 (430). FIG. 4B shows an alternate representation of the data points of FIG. 4A. The filled portions of each bar 412, 422 and 432 represent portions of the inverted lists for data points in the respective clusters 410, 420 and 430 that are in the shortlist 332. The unfilled portions of each bar represent portions of the inverted lists for the remaining data points in the respective clusters 410, 420 and 430 that are not in the shortlist 332.

In accordance with an embodiment, a shortlist can be constructed prior to receiving a query (e.g., the query 220 of FIGS. 2A and 2B) using a distance estimator, such as described above with respect to FIG. 3B. First, the data in each inverted list $L_1 \ldots L_k$ are ordered according to the squared distance $d(x, c(x))^2$ between each data point x in the respective inverted list and the centroid of the respective cluster, from closest to farthest. Next, the minimum and maximum squared distances to the centroid, $R_0$ and $R_{max}$, are computed as follows:

$$R_0 = \min d(x,c(x))^2$$

$$R_{max} = \max\, d(x,c(x))^2$$

Figure 5A:
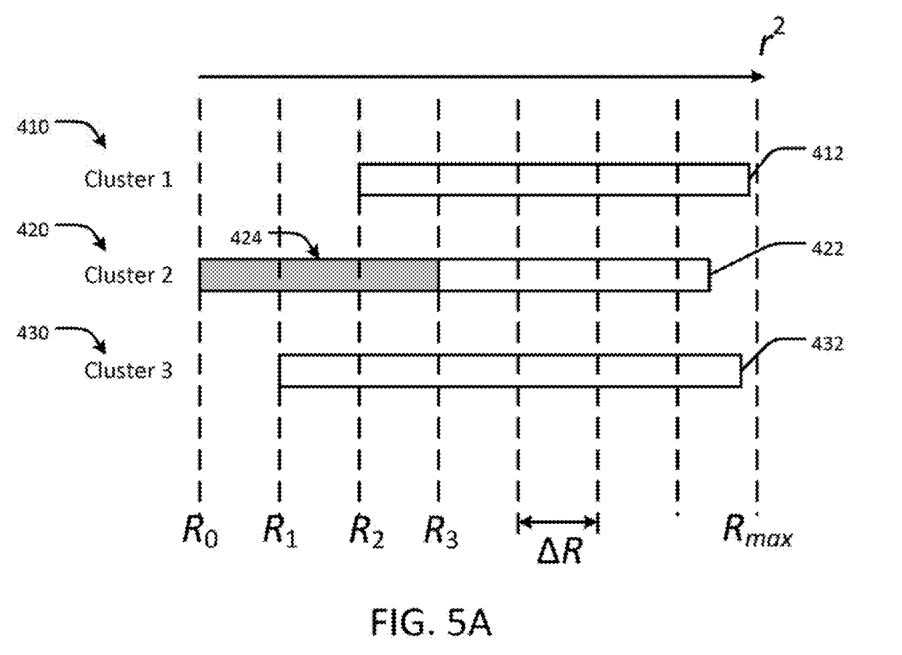
FIGS. 5A and 5B show an example of a shortlist computed using a squared distance formula, in accordance with an embodiment of the present invention.

FIG. 5A shows an example of a shortlist computed using the squared distance formula discussed in the previous paragraph. The data points in each list $L_1 \ldots L_k$ are sorted according to the squared distance to the center $d(x, c_i)^2$, where i is 1 to k. The range of the squared distances $[R_0, R_{max}]$ is uniformly divided into fixed intervals having a length of $\Delta R$. The boundaries of each interval are defined as follows:

$$R_i = R_0 + i\Delta R$$

Figure 6A:
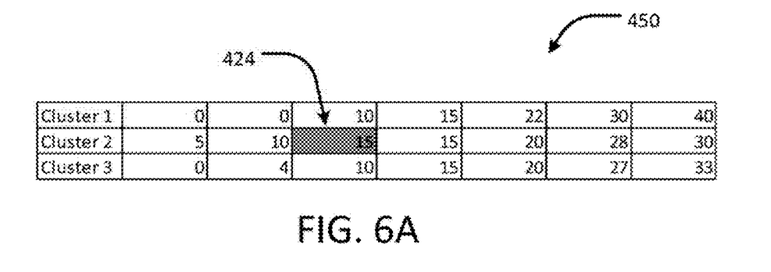
FIGS. 6A and 6B show an example lookup table, in accordance with an embodiment of the present invention.

FIG. 6A shows an example lookup table 450, where each cell includes the number of data points in each inverted list 410, 420, 430 whose squared distance to the center $d(x, c_i)^2$ is less than $R_j$ as follows:

$$W(i,j) = \text{num}(\{x | d(x,c_i)^2 < R_j, x \in L_i\})$$

In FIG. 6A, the shaded portion 424 of the example inverted list 420 corresponds to fifteen data points between intervals $R_0$ and $R_3$. That is, Cluster 2 contains fifteen data points x having a distance of $R_3$ or less from the centroid of Cluster 2. Other cells of the lookup table 450 represent similar values. The example lookup table 450 represents values that can be computed prior to receiving a query.

Figure 5B:
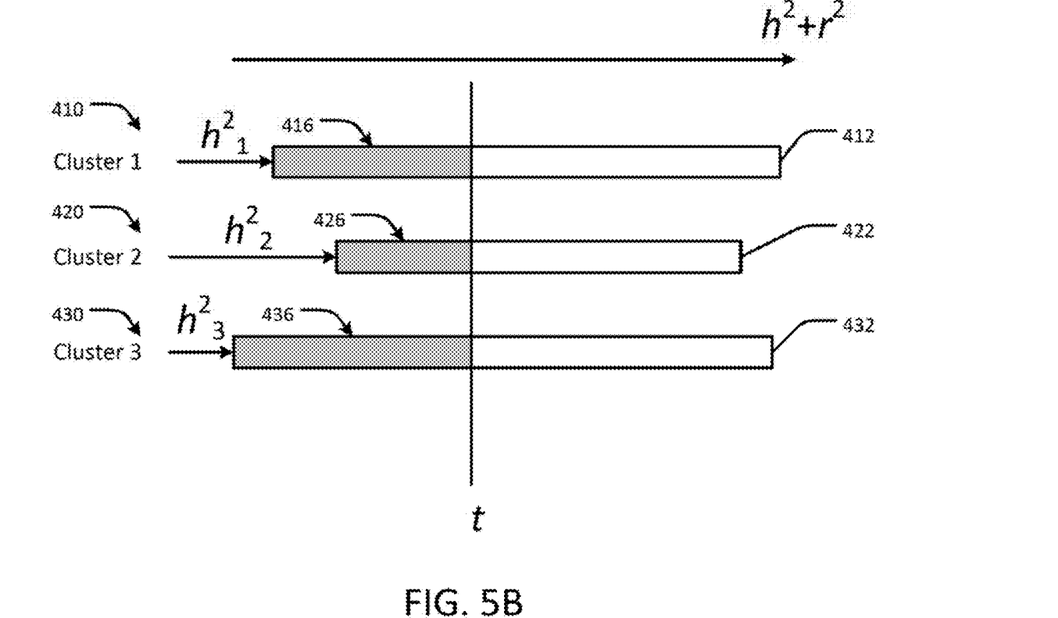

As shown in FIG. 5B, when a query y is received, the lookup table 450 is modified by shifting the inverted lists to determine the number of data points w(i, t) in each inverted list (416, 426, 436) whose estimated distance to the query y from the centroids of each cluster is less than a value t as follows:

$$w(i, t) = \text{num}(\{x | d(x, c_i)^2 + d(y, c_i)^2 < t, x \in L_i\})$$
$$= \text{num}(\{x | d(x, c_i)^2 < t - d(y, c_i)^2, x \in L_i\})$$
$$= W\left(i, \left\lceil \frac{t - d(y, c_i)^2 - R_0}{\Delta R} \right\rceil\right)$$

When the query y is received, the estimated distance $d(y, c_i)^2$ is computed for all i. Since each row in the lookup table 450 is in increasing order, the column-wise sum is also in increasing order. A binary search can be used to find the appropriate threshold of the estimated distance t that meets a given shortlist size T. The binary search for t is performed within the range $[\min d(y, c_i)^2 + R_0, \max d(x, c_i)^2 + R_{max}]$, and stopped when the lower bound satisfies the following:

$$T \le \sum_{i=1}^{k} w(i, t)$$

Figure 6B:
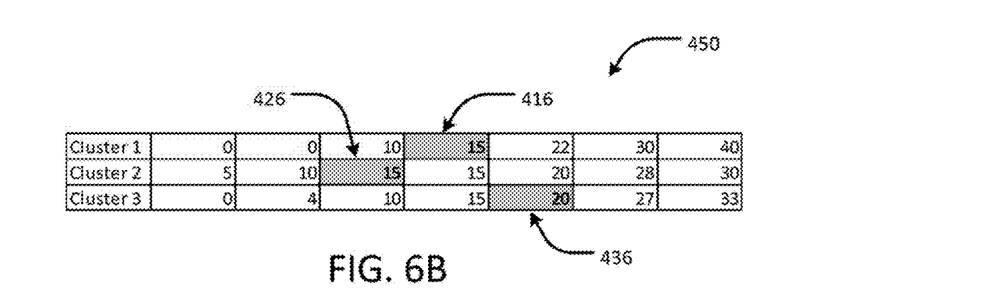

The resulting shortlist is constructed by collecting points that have estimated distances smaller than the threshold found by this binary search. In the example of FIG. 6B, the shaded cells of the table 416, 426 and 436 represent fifty of data objects in Clusters 1, 2 and 3 that are closest to the query y.

A parameter selection scheme based on cost analysis can be employed to minimize computational overhead when constructing a shortlist in accordance with an embodiment. A computational cost C can be formulated as $C = C_S + C_R$, where $C_S$ and $C_R$ are the costs for computing the shortlist and for sorting the shortlist, respectively. Computing the distances to the near coarse quantizer centers can be represented as:

$$C_S = kD + k \log k$$

The cost for the sorting can be represented as:

$$C_R = MT$$

where M is a unit cost for one distance estimation calculation. The shortlist construction technique in accordance with an embodiment runs with the following time complexity:

$$C_{S'} = kD + k \log \frac{R_{max} - R_0}{\Delta R}$$

To ensure $C_S = C_{S'}$, the $\Delta R$ parameter can be set to satisfy:

$$\frac{R_{max} - R_0}{\Delta R} = k$$

Example Methodologies

Figure 7:
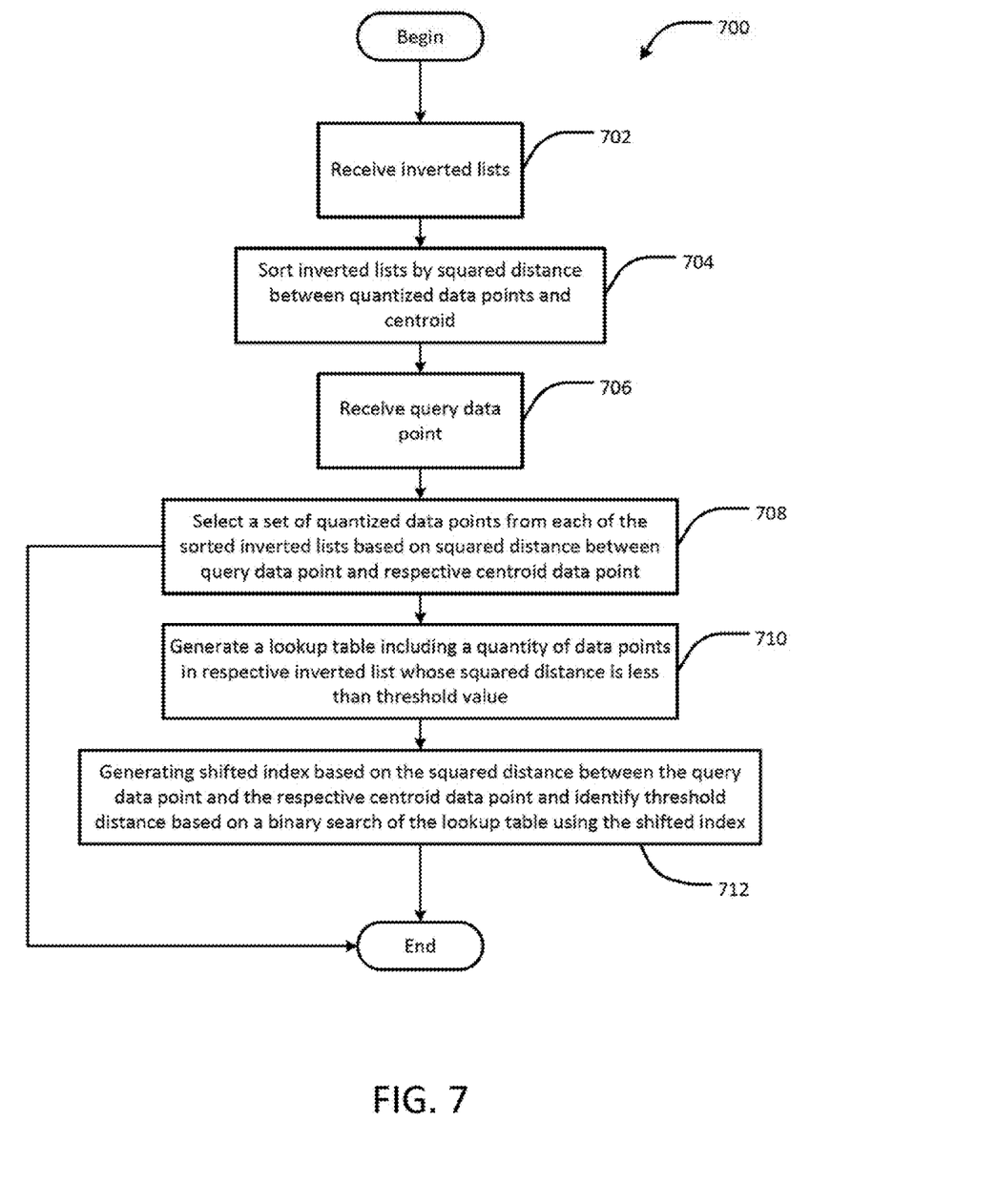
FIG. 7 is a flow diagram representative of an example methodology for indexing and searching for data, in accordance with an embodiment of the present invention.

FIG. 7 is a flow diagram of an example methodology 700 for indexing, encoding and searching for data, in accordance with an embodiment. The example methodology 700 may, for example, be implemented by the indexer 212, encoder 214, or searcher 222 of FIG. 1. The method 700 begins by receiving 702 a plurality of inverted lists of quantized data points. Each inverted list has a centroid data point associated with the cluster containing the quantized data points referenced by the inverted list. The method 700 continues by sorting 704 each inverted list according to a squared distance between each quantized data point in the respective inverted list and the respective centroid data point, such as described above with respect to FIG. 5A. The method 700 continues by receiving 706 a query data point and selecting 708 a set of quantized data points from each of the sorted inverted lists based on a squared distance between the query data point and the respective centroid data point, such as described above with respect to FIGS. 4A, 5B and 6B. In some embodiments, the method 700 includes generating 710 a lookup table having a plurality of cells arranged in rows and columns, such as described above with respect to FIGS. 5B and 6B. For example, each row may represent one of the inverted lists and each column may represent a different threshold value ranging between zero and a maximum of the squared distances. Each cell of the lookup table may include a quantity of the data points in the respective inverted list whose squared distance is less than the threshold value corresponding to the column of the cell. In some such embodiments, the method 700 may continue by generating 712 a shifted index for each row of the lookup table, each shifted index based on the squared distance between the query data point and the respective centroid data point, and identifying a threshold distance based on a binary search of the lookup table where the columns of the respective row are shifted with respect to another row using the shifted index. In such cases, the squared distance between each quantized data point in the selected set of quantized data points and the respective centroid data point is less than the threshold distance.

Example Computing Device

Figure 8:
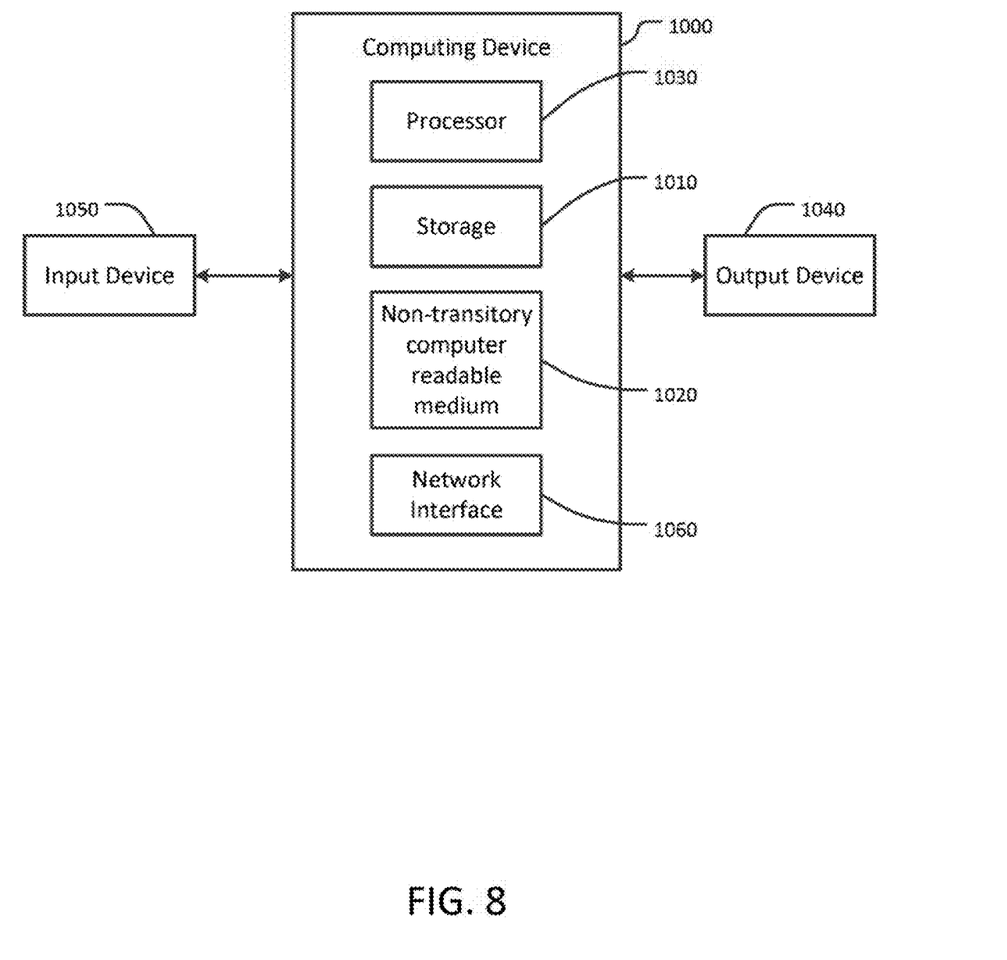
FIG. 8 is a block diagram representing an example computing device that may be used in accordance with an embodiment of the present invention.

FIG. 8 is a block diagram representing an example computing device 1000 that may be used to perform any of the techniques as variously described in this disclosure. For example, the computer 110, server 120, or any combination of these (such as described with respect to FIG. 1) may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals. The computing device 1000 can include and/or be operatively coupled to various suitable devices for performing one or more of the functions as variously described in this disclosure. For instance, the computing device may include or be operatively coupled to a network interface 1060 for communicating with other devices via a network, such as the Internet.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the image editor 116 and application 122, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computer 110 and the server 120, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The processor(s) are configured to carry out a process including receiving a plurality of inverted lists of quantized data points, each inverted list having a centroid data point associated therewith; sorting each inverted list according to a squared distance between each quantized data point in the respective inverted list and the respective centroid data point; receiving a query data point; and selecting a set of quantized data points from each of the sorted inverted lists based on a squared distance between the query data point and the respective centroid data point. In some cases, the process further includes generating a lookup table having a plurality of cells arranged in rows and columns, each row representing one of the inverted lists and each column representing a different threshold value ranging between zero and a maximum of the squared distances, each cell of the lookup table including a quantity of the data points in the respective inverted list whose squared distance is less than the threshold value corresponding to the column of the cell. In some such cases, the process further includes generating a shifted index for each row of the lookup table, each shifted index based on the squared distance between the query data point and the respective centroid data point; and identifying a threshold distance based on a binary search of the lookup table where the columns of the respective row are shifted with respect to another row using the shifted index, where the squared distance between each quantized data point in the selected set of quantized data points and the respective centroid data point is less than the threshold distance. In some cases, the different threshold values are uniformly distributed within the range. In some cases, the selected set of quantized data points contains less than all of the quantized data points in any of the inverted lists. In some cases, each inverted list is sorted in ascending order of distance. In some cases, the quantized data points and the query data point represent high-dimension image descriptors. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

Figure 9:
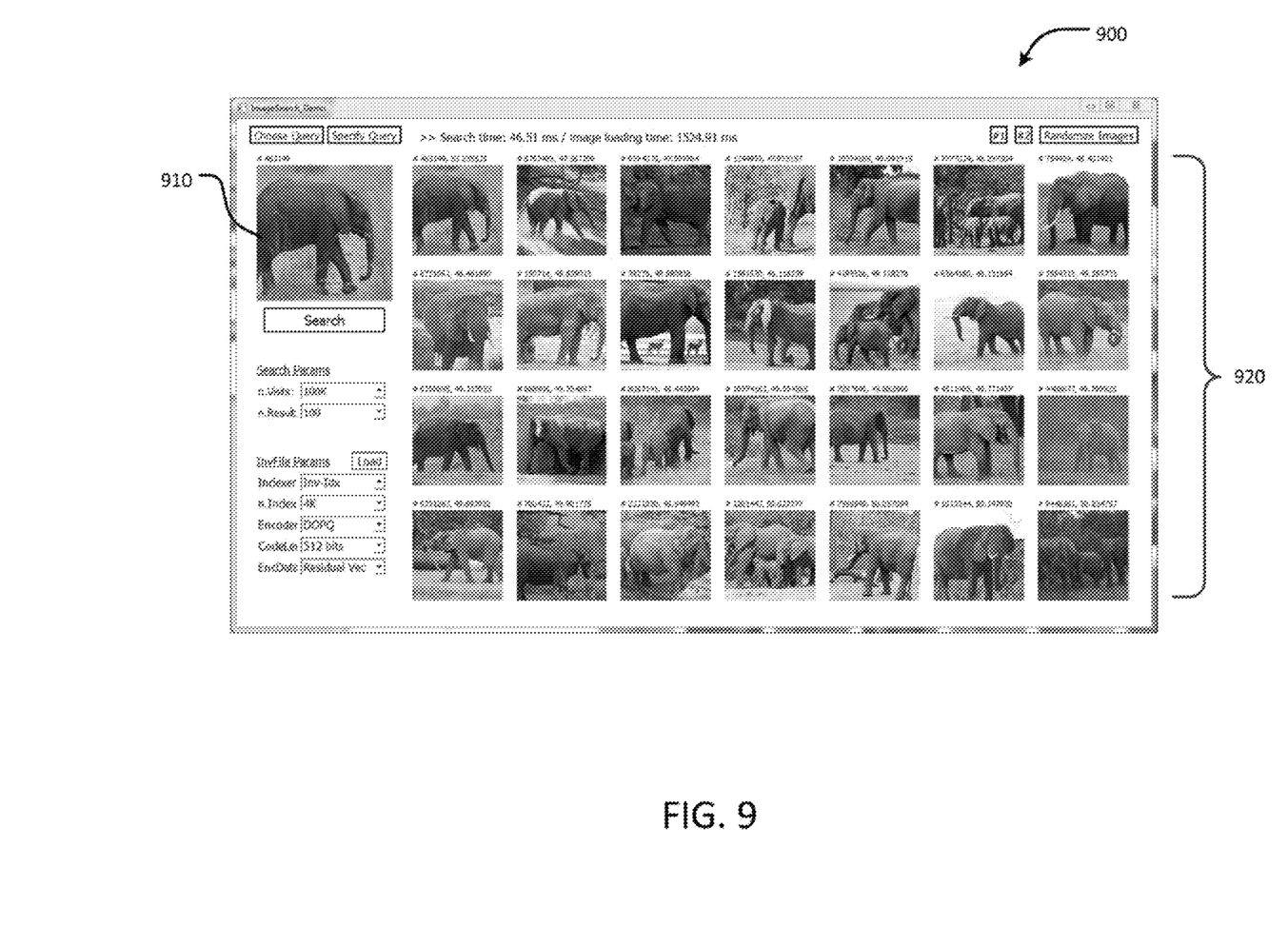
FIG. 9 is an example screenshot of a user interface, in accordance with an embodiment of the present invention.

FIG. 9 is an example screenshot of a user interface 900 that can be used for large scale image retrieval, in accordance with an embodiment. The result of a search, performed against an image database using a query image 910 and one or more of the search techniques described in this disclosure, may include one or more of the data objects in the database, represented as a set of images 920 which match the query. It will be understood that various embodiments can be employed to search any type of data, including images, text, documents or other types of data. Such embodiments are particularly useful for quickly searching highly dimensional data, such as image data, which can have many quantifiable characteristics including pixel colors, gradients and arrangements.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
   receiving a plurality of inverted lists of quantized data points, each inverted list having a centroid data point associated therewith, the centroid data point representing an average of all of the quantized data points in the respective inverted list;
   sorting, by a processor, each inverted list according to a squared distance between each quantized data point in the respective inverted list and the respective centroid data point in the same inverted list as the quantized data point;
   receiving a query data point; and
   selecting, by the processor, a set of quantized data points from across each of the sorted inverted lists, each selected data point being within a distance of the respective centroid data point, the distance defined by a squared distance between the query data point and the respective centroid data point, wherein a first vector from the respective centroid data point in the same inverted list as the selected quantized data point to the query data point is orthogonal to a second vector from the respective centroid data point in the same inverted list as the selected quantized data point to the selected quantized data point.

2. The method of claim 1, further comprising:
   generating a lookup table having a plurality of cells arranged in rows and columns, each row representing one of the inverted lists and each column representing a different threshold value ranging between zero and a maximum of the squared distances, each cell of the lookup table including a quantity of the data points in the respective inverted list whose squared distance is less than the threshold value corresponding to the column of the cell.

3. The method of claim 2, further comprising:
   generating a shifted index for each row of the lookup table, each shifted index based on the squared distance between the query data point and the respective centroid data point; and
   identifying a threshold distance based on a binary search of the lookup table where the columns of the respective row are shifted with respect to another row using the shifted index,
   wherein the squared distance between each quantized data point in the selected set of quantized data points and the respective centroid data point is less than the threshold distance.

4. The method of claim 2, wherein the different threshold values are uniformly distributed within the range.

5. The method of claim 1, wherein the selected set of quantized data points contains less than all of the quantized data points in any of the inverted lists.

6. The method of claim 1, wherein each inverted list is sorted in ascending order of distance.

7. The method of claim 1, wherein the quantized data points and the query data point represent high-dimension image descriptors.

8. A system comprising:
   a storage;
   a processor operatively coupled to the storage, the processor configured to execute instructions stored in the storage that when executed cause the processor to carry out a process comprising:
      receiving a plurality of inverted lists of quantized data points, each inverted list having a centroid data point associated therewith, the centroid data point representing an average of all of the quantized data points in the respective inverted list;
      sorting each inverted list according to a squared distance between each quantized data point in the respective inverted list and the respective centroid data point in the same inverted list as the quantized data point;
      receiving a query data point; and
      selecting a set of quantized data points from across each of the sorted inverted lists, each selected data point being within a distance of the respective centroid data point, the distance defined by a squared distance between the query data point and the respective centroid data point, wherein a first vector from the respective centroid data point in the same inverted list as the selected quantized data point to the query data point is orthogonal to a second vector from the respective centroid data point in the same inverted list as the selected quantized data point to the selected quantized data point.

9. The system of claim 8, wherein the process further comprises:
generating a lookup table having a plurality of cells arranged in rows and columns, each row representing one of the inverted lists and each column representing a different threshold value ranging between zero and a maximum of the squared distances, each cell of the lookup table including a quantity of the data points in the respective inverted list whose squared distance is less than the threshold value corresponding to the column of the cell.

10. The system of claim 9, wherein the process further comprises:
generating a shifted index for each row of the lookup table, each shifted index based on the squared distance between the query data point and the respective centroid data point; and
identifying a threshold distance based on a binary search of the lookup table where the columns of the respective row are shifted with respect to another row using the shifted index,
wherein the squared distance between each quantized data point in the selected set of quantized data points and the respective centroid data point is less than the threshold distance.

11. The system of claim 9, wherein the different threshold values are uniformly distributed within the range.

12. The system of claim 8, wherein the selected set of quantized data points contains less than all of the quantized data points in any of the inverted lists.

13. The system of claim 8, wherein each inverted list is sorted in ascending order of distance.

14. The system of claim 8, wherein the quantized data points and the query data point represent high-dimension image descriptors.

15. A non-transitory computer program product having instructions encoded thereon that when executed by one or more processors cause a process to be carried out, the process comprising:
receiving a plurality of inverted lists of quantized data points, each inverted list having a centroid data point associated therewith, the centroid data point representing an average of all of the quantized data points in the respective inverted list;
sorting each inverted list according to a squared distance between each quantized data point in the respective inverted list and the respective centroid data point in the same inverted list as the quantized data point;
receiving a query data point; and
selecting a set of quantized data points from across each of the sorted inverted lists, each selected data point being within a distance of the respective centroid data point, the distance defined by a squared distance between the query data point and the respective centroid data point, wherein a first vector from the respective centroid data point in the same inverted list as the selected quantized data point to the query data point is orthogonal to a second vector from the respective centroid data point in the same inverted list as the selected quantized data point to the selected quantized data point.

16. The computer program product of claim 15, wherein the process further comprises:
generating a lookup table having a plurality of cells arranged in rows and columns, each row representing one of the inverted lists and each column representing a different threshold value ranging between zero and a maximum of the squared distances, each cell of the lookup table including a quantity of the data points in the respective inverted list whose squared distance is less than the threshold value corresponding to the column of the cell.

17. The computer program product of claim 16, wherein the process further comprises:
generating a shifted index for each row of the lookup table, each shifted index based on the squared distance between the query data point and the respective centroid data point; and
identifying a threshold distance based on a binary search of the lookup table where the columns of the respective row are shifted with respect to another row using the shifted index,
wherein the squared distance between each quantized data point in the selected set of quantized data points and the respective centroid data point is less than the threshold distance.

18. The computer program product of claim 16, wherein the different threshold values are uniformly distributed within the range.

19. The computer program product of claim 15, wherein the selected set of quantized data points contains less than all of the quantized data points in any of the inverted lists.

20. The computer program product of claim 15, wherein the quantized data points and the query data point represent high-dimension image descriptors.

* * * * *